(12) United States Patent
Yasuda et al.

(10) Patent No.: US 9,395,536 B2
(45) Date of Patent: Jul. 19, 2016

(54) OPTICAL DEFLECTOR INCLUDING SEPARATED PIEZOELECTRIC PORTIONS ON PIEZOELECTRIC ACTUATORS AND ITS DESIGNING METHOD

(71) Applicant: STANLEY ELECTRIC CO., LTD., Meguro-ku, Tokyo (JP)

(72) Inventors: Yoshiaki Yasuda, Yokohama (JP); Masanao Tani, Yamato (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 24 days.

(21) Appl. No.: 14/282,906

(22) Filed: May 20, 2014

(65) Prior Publication Data
US 2014/0355088 A1 Dec. 4, 2014

(30) Foreign Application Priority Data

May 28, 2013 (JP) ................................. 2013-112342

(51) Int. Cl.
G02B 26/08 (2006.01)
G02B 26/10 (2006.01)
G02B 26/12 (2006.01)

(52) U.S. Cl.
CPC .......... *G02B 26/101* (2013.01); *G02B 26/0858* (2013.01); *G02B 26/105* (2013.01); *Y10T 29/42* (2015.01)

(58) Field of Classification Search
CPC ............. G02B 26/0858; G02B 26/105; G02B 26/101; G02B 26/0841; G02B 26/0833; G02B 26/085; G02B 26/10; G02B 7/1821; G02B 26/08; G02B 27/48; G02B 21/0048; G02B 26/02; G02B 26/0875; G02B 26/103; G02B 6/2931; G02B 6/356; G02B 6/35
See application file for complete search history.

(56) References Cited

U.S. PATENT DOCUMENTS

2008/0225363 A1 9/2008 Saitoh et al.
2009/0180167 A1 7/2009 Tani et al.
(Continued)

FOREIGN PATENT DOCUMENTS

EP 2233961 A1 9/2010
JP 2008-020701 A 1/2008
(Continued)

OTHER PUBLICATIONS

Extended European Search Report dated Sep. 24, 2014 issued in counterpart European Application No. 14170118.5.

*Primary Examiner* — Pascal M. Bui-Pho
*Assistant Examiner* — Sharrief Broome
(74) *Attorney, Agent, or Firm* — Holtz, Holtz & Volek PC

(57) ABSTRACT

In an optical deflector including a mirror, a frame, torsion bars, first and second piezoelectric actuators coupled to both of the torsion bars, and first and second coupling bars, each of the first and second piezoelectric actuators is divided into first, second and third areas in accordance with a polarization polarity distribution obtained by performing a simulation upon the optical deflector where piezoelectric portions with no slits are hypothetically provided in the first and second piezoelectric actuators while a predetermined rocking operation is performed upon the mirror. First piezoelectric portions are formed in the first and third areas of the first piezoelectric actuator, and second piezoelectric portions are formed in the first and third areas of said second piezoelectric actuator. A first drive voltage applied to the first piezoelectric portions is opposite in phase to a second drive voltage applied to the second piezoelectric portions.

14 Claims, 19 Drawing Sheets

(56) References Cited

U.S. PATENT DOCUMENTS

| | | | |
|---|---|---|---|
| 2009/0284485 A1* | 11/2009 | Colgate et al. | 345/173 |
| 2010/0195180 A1* | 8/2010 | Akanuma et al. | 359/200.8 |
| 2010/0277783 A1 | 11/2010 | Takahashi | |
| 2011/0029203 A1* | 2/2011 | Watson et al. | 701/45 |
| 2011/0141538 A1* | 6/2011 | Mizumoto | G02B 26/0841 359/224.1 |
| 2013/0083379 A1 | 4/2013 | Tanaka et al. | |

FOREIGN PATENT DOCUMENTS

| | | |
|---|---|---|
| JP | 2009-169326 A | 7/2009 |
| JP | 2009-223165 A | 10/2009 |
| JP | 2010-197994 A | 9/2010 |
| WO | 2012176492 A1 | 12/2012 |

\* cited by examiner

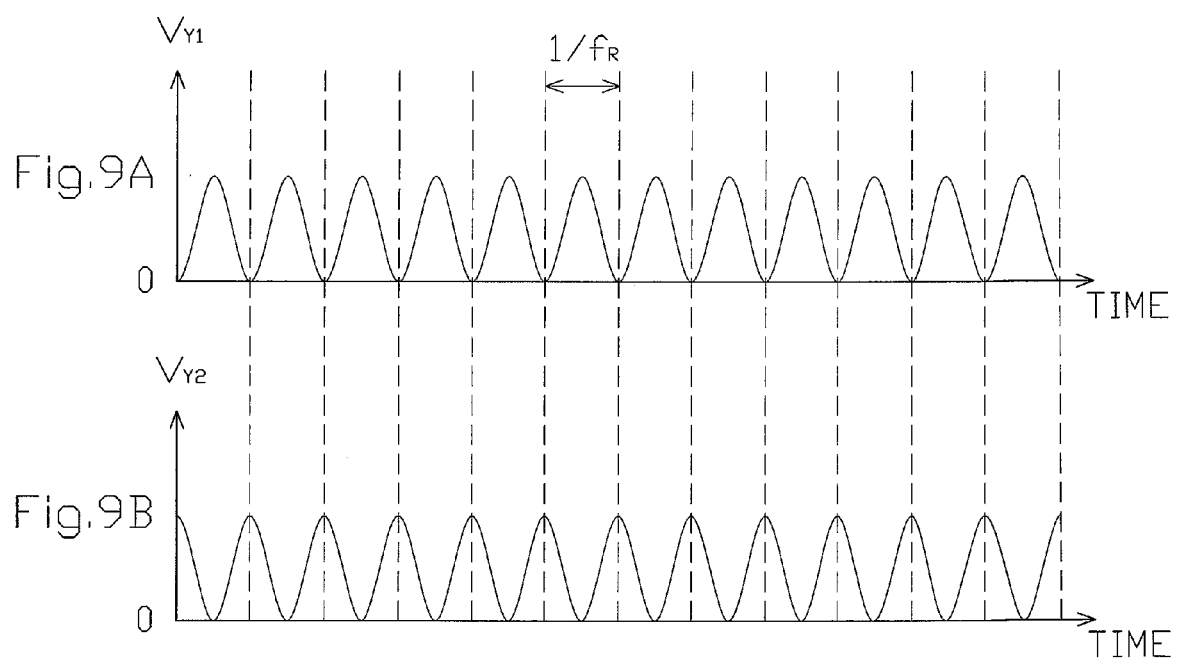

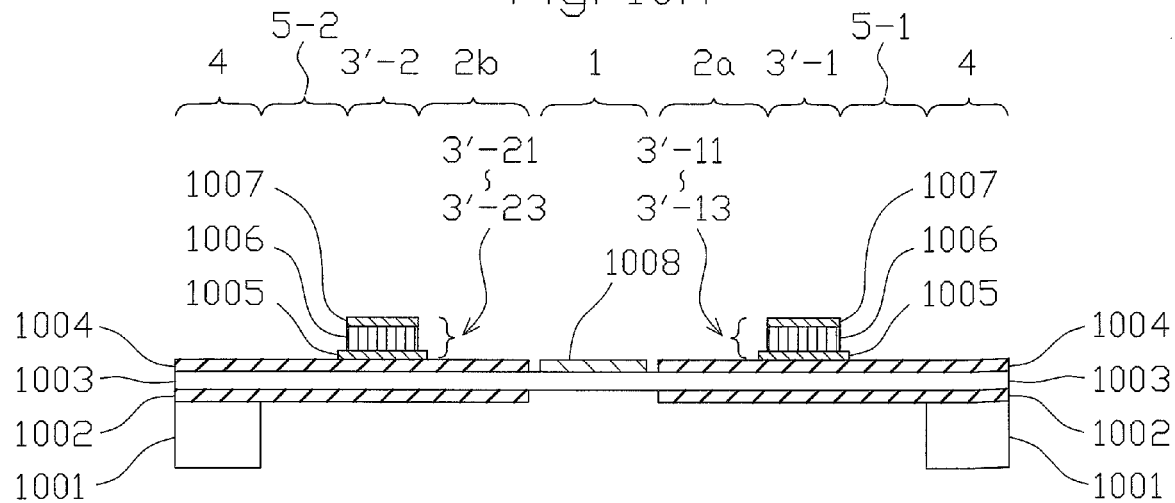
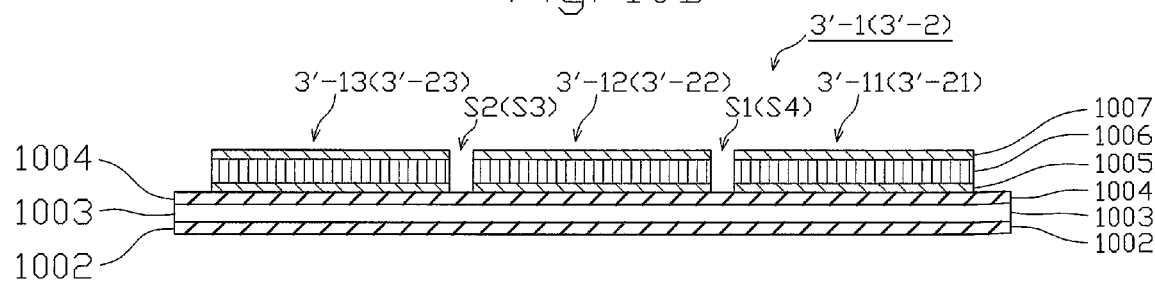
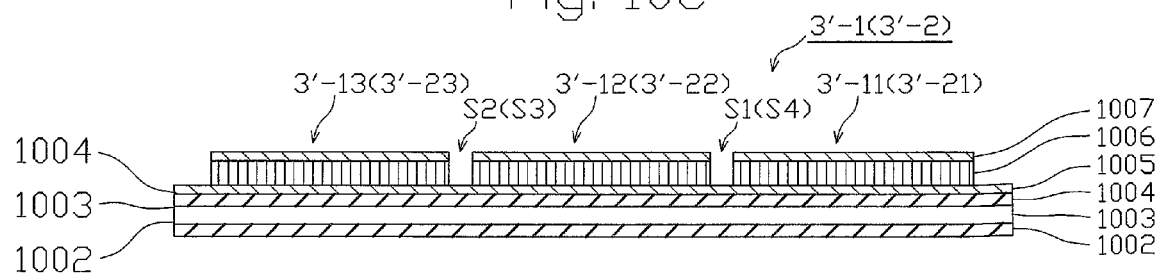
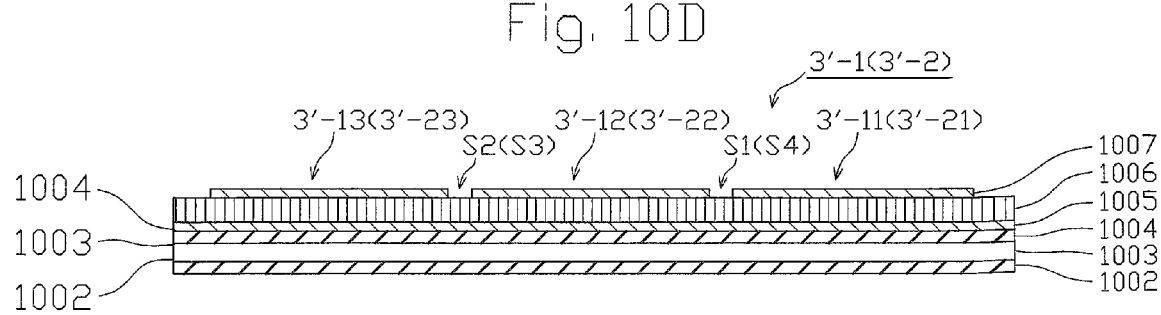

OPTICAL DEFLECTOR INCLUDING SEPARATED PIEZOELECTRIC PORTIONS ON PIEZOELECTRIC ACTUATORS AND ITS DESIGNING METHOD

This application claims the priority benefit under 35 U.S.C. §119 to Japanese Patent Application No. JP2013-112342 filed on May 28, 2013, which disclosure is hereby incorporated in its entirety by reference.

BACKGROUND

1. Field

The presently disclosed subject matter relates to an optical deflector used in a projector, a headlamp, a bar code reader, a laser printer, a laser head amplifier, a head-up display unit and the like, and its designing method.

2. Description of the Related Art

FIG. 1A is a perspective view illustrating a first prior art one-dimensional optical deflector, and FIG. 1B is a partial enlargement of the optical deflector of FIG. 1A enclosed by a dotted line B in FIG. 1A (see: FIG. 5 of JP2008-20701A).

As illustrated in FIGS. 1A and 1B, the first prior art one-dimensional optical deflector is constructed by a circular mirror 1, a pair of torsion bars 2a and 2b oppositely arranged along a Y-axis (rocking axis) each having an end coupled to the circumference of the mirror 1, a pair of semi-circular piezoelectric actuators 3-1 and 3-2 opposite to each other with respect to the mirror 1 each coupled to both of the torsion bars 2a and 2b for rocking the mirror 1 around the Y-axis, a rectangular fixed frame 4 surrounding the semi-circular piezoelectric actuators 3-1 and 3-2 each including one piezoelectric portion 3-11 (3-21) made of lead titanate zirconate $PbZrTiO_2$ (PZT), and a pair of coupling bars 5-1 and 5-2 arranged along an X-axis perpendicular to the Y-axis having ends coupled to the inner circumference of the fixed frame 4 and other ends coupled to the outer circumference of the semi-circular piezoelectric actuators 3-1 and 3-2.

In FIGS. 1A and 1B, in a resonance state, when the rocking frequency "f" of the semi-circular piezoelectric actuators 3-1 and 3-2 is close to the natural frequency of a mechanically-vibrating system of the mirror 1, the rocking angle of the mirror 1 with respect to the Y-axis can be increased.

In the above-mentioned resonance state, the inventors found that, portions of the semi-circular piezoelectric actuators 3-1 and 3-2 where the torsion bars 2a and 2b and the coupling bars 5-1 and 5-2 are coupled form loops having maximum amplitudes of a resonant vibration, while portions of the semi-circular piezoelectric actuators 3-1 and 3-2 having 45°-angled diameter directions with respect to a diameter line between the torsion bars 2a and 2b and a diameter line between the coupling bars 5-1 and 5-2 form nodes having essentially zero amplitudes of the resonant vibration.

The loop portions and node portions of the semi-circular piezoelectric actuators 3-1 and 3-2 are discussed in more detail below.

In FIG. 1B, radial axes C1, C2, ..., C16 are defined at intervals 22.5° centered at a point "0" on a plane of the fixed frame 4. Also, a circumferential line L is defined at a center line between the outer and inner circumferences of the semi-circular piezoelectric actuators 3-1 and 3-2. Further, P1, P2, ..., P16 are defined as locations at intersections between the circumferential line L and the radial axes C1, C2, ..., C16, respectively.

The X-axis is defined as the direction of the radial axis C5, and the Y-axis is defined as the direction of the radial axis C1. In this case, the Y-axis is shifted from the rocking direction of the mirror 1 by a half thickness of the mirror 1; however, since this half thickness is very thin, the Y-axis is substantially the same as the rocking direction of the mirror 1. Also, a Z-axis is defined as a direction perpendicular to the X-axis and the Y-axis.

In FIG. 2, which illustrates the amplitudes at the locations P9, P10, P11, P12 and P13 along the Z-axis of FIG. 1B in a resonant state whose resonant frequency is 18.877 kHz, three or four amplitudes at three or four X-coordinate values and at one Y-coordinate value were measured. As illustrated in FIG. 2, the amplitude at the location P9 was about 4.4 mm, the amplitude at the location P10 was about 1.6 mm, the amplitude at the location P11 was about 0.3 mm, the amplitude at the location P12 was about 1.5 mm, and the amplitude at the location P13 was about 2.2 mm. Therefore, the amplitude at the location P11 was minimum, while the amplitude at the location P9 was maximum. Also, the amplitudes at the locations P10 and P12 were medium.

The amplitude at the location P13 is smaller than the amplitude at the location P9, because the coupling bar 5-2 is located at the location P13 to suppress the vibration of the portion of the semi-circular piezoelectric actuator 3-2 at the location P13. That is, if no coupling bar is present at the location P13, the amplitude at the location P13 would be considered to be the same as the amplitude at the location P9, i.e., larger than 2.2 mm.

As is understood from FIG. 2, the amplitudes at the locations P1, P2, ..., P16 of the circumferential line L in a resonant state can be as shown in FIG. 3. Thus, although the amplitudes at the locations P1, P9, P10 and P16 are opposite in phase to those at the locations P12, P13 and P14, a drive voltage $V_{Y1}$ is applied to the entire semi-circular piezoelectric actuator 3-1. Also, although the amplitudes at the locations P1, P2, P8 and P9 are opposite in phase to those at the locations P4, P5 and P6, a drive voltage $V_{Y2}$ opposite in phase to the drive voltage $V_{Y1}$ is applied to the entire semi-circular piezoelectric actuator 3-2. As a result, the drive power by the drive voltages $V_{Y1}$ and $V_{Y2}$ would be decreased.

FIG. 4 is a perspective view illustrating a second prior art one-dimensional optical deflector (see: FIGS. 26, 27, 28 and 29 of JP2010-197994A and US2010/0195180A1).

As illustrated in FIG. 4, the second prior art one-dimensional optical deflector is constructed by a circular mirror 101, a pair of torsion bars 102a and 102b arranged along a Y-axis each having an end coupled to the circumference of the mirror 101, a pair of linear piezoelectric actuators 103a-1 and 103a-2 each having an end coupled to the torsion bar 102a, a pair of linear piezoelectric actuators 103b-1 and 103b-2 each having an end coupled to the torsion bar 102b, and a rectangular fixed frame 104 coupled to other ends of the linear piezoelectric actuators 103a-1, 103a-2, 103b-1 and 103b-2.

In FIG. 4, piezoelectric portions 103a-11, 103a-21, 103b-11 and 103b-21 made of PZT are formed on only two-thirds of the linear piezoelectric actuators 103a-1, 103a-2, 103b-1 and 103b-2, respectively. That is, if a length between the torsion bar 102a (102b) and the fixed frame 4 is L, the piezoelectric portions 103a-11, 103a-21, 103b-11 and 103b-21 are formed in length portions having a length $L_P$ (=2L/3) from the torsion bar 102a (102b). In this case, a drive voltage $V_{Y1}$ is applied to the piezoelectric portions 103a-11 and 103b-11, while a drive voltage $V_{Y2}$ opposite in phase to the drive voltage $V_{Y1}$ is applied to the piezoelectric portions 103a-21 and 103b-21. Thus, the rocking angle of the mirror 1 can be maximum under the same drive voltages $V_{Y1}$ and $V_{Y2}$.

FIG. 5 is a perspective view illustrating a third prior art one-dimensional optical deflector (see: FIGS. 30, 31, 32, 33 and 34 of JP2010-197994A and US2010/0195180A1).

In FIG. 5, further piezoelectric portions 103a-12, 103a-22, 103b-12 and 103b-22 separated from the piezoelectric portions 103a-11, 103a-21, 103b-11 and 103b-21 are formed on the linear piezoelectric actuators 103a-1, 103a-2, 103b-1 and 103b-2, respectively, of FIG. 4. In this case, the drive voltage $V_{Y1}$ is applied to the piezoelectric portions 103a-22 and 103b-22, while the drive voltage $V_{Y2}$ is applied to the piezoelectric portions 103a-12 and 103b-12. Thus, the rocking angle of the mirror 1 can be further increased under the same drive voltages $V_{Y1}$ and $V_{Y2}$.

In FIGS. 4 and 5, the length $L_P$ of the piezoelectric portions 103a-11, 103a-21, 103b-11 and 103b-22 is determined in accordance with the maximum value of the flexing angle of the linear piezoelectric actuators 103a-1, 103a-2, 103b-1 and 103b-2 when no torsion bar is coupled thereto or the maximum value of the moment of the linear piezoelectric actuators 103a-1, 103a-2, 103b-1 and 103b-2 when the torsion bars 102a and 102b are fixed.

Therefore, even if the one-dimensional optical deflector of FIG. 1 is combined with the one-dimensional optical deflector of FIG. 4 or 5, the drive power cannot always be increased. As a result, the drive power cannot be increased and the reliability cannot be enhanced.

SUMMARY

The presently disclosed subject matter seeks to solve one or more of the above-described problems.

According to the presently disclosed subject matter, in an optical deflector including: a mirror; a frame surrounding the mirror; first and second torsion bars oppositely arranged along a first axis of the frame, the first and second torsion bars having an end coupled to a circumference of the mirror; first and second piezoelectric actuators opposite to each other with respect to the mirror, for rocking the mirror around the first axis, each of the first and second piezoelectric actuators being coupled to both of the first and second torsion bars; and first and second coupling bars each coupled between the frame and one of the first and second piezoelectric actuators, each of the first and second piezoelectric actuators is divided into first, second and third areas from the first torsion bar to the second torsion bar in accordance with a polarization polarity distribution obtained by performing a predetermined simulation upon the optical deflector where piezoelectric portions with no slits are hypothetically provided in the first and second piezoelectric actuators while a predetermined rocking operation is performed upon the mirror. First piezoelectric portions are formed in the first and third areas of the first piezoelectric actuator, while second piezoelectric portions are formed in the first and third areas of the second piezoelectric actuator. A first drive voltage applied to the first piezoelectric portions is opposite in phase to a second drive voltage applied to the second piezoelectric portions.

Also, in a method for designing an optical deflector comprising: a mirror; a frame surrounding the mirror; first and second torsion bars oppositely arranged along a first axis of the frame, the first and second torsion bars having an end coupled to a circumference of the mirror; first and second piezoelectric actuators opposite to each other with respect to the mirror, for rocking the mirror around the first axis, each of the first and second piezoelectric actuators being coupled to both of the first and second torsion bars; and first and second coupling bars each coupled between the frame and one of the first and second piezoelectric actuators, a predetermined simulation is performed upon the optical deflector where piezoelectric portions with no slits are hypothetically provided in the first and second piezoelectric actuators while a predetermined rocking operation is performed upon the mirror to obtain a polarization polarity distribution. Then, each of the first and second piezoelectric actuators is divided into first, second and third areas from the first torsion bar to the second torsion bar in accordance with boundaries of the polarization polarity distribution. Finally, first piezoelectric portions are formed in the first and third areas of the first piezoelectric actuator, and second piezoelectric portions are formed in the first and third areas of the second piezoelectric actuator. In this case, a first drive voltage applied to the first piezoelectric portions is opposite in phase to a second drive voltage applied to the second piezoelectric portions.

According to the presently disclosed subject matter, the drive power can be increased and the reliability can be enhanced.

BRIEF DESCRIPTION OF THE DRAWINGS

The above and other advantages and features of the presently disclosed subject matter will be more apparent from the following description of certain embodiments, as compared with the prior art, taken in conjunction with the accompanying drawings, wherein:

FIGS. 9A and 9B are timing diagrams of the drive voltages applied to the piezoelectric actuators of FIG. 8;

FIGS. 10A, 10B, 10C and 10D are cross-sectional views of the one-dimensional optical deflector of FIG. 6;

DETAILED DESCRIPTION OF EXEMPLARY EMBODIMENTS

Figure 1A:
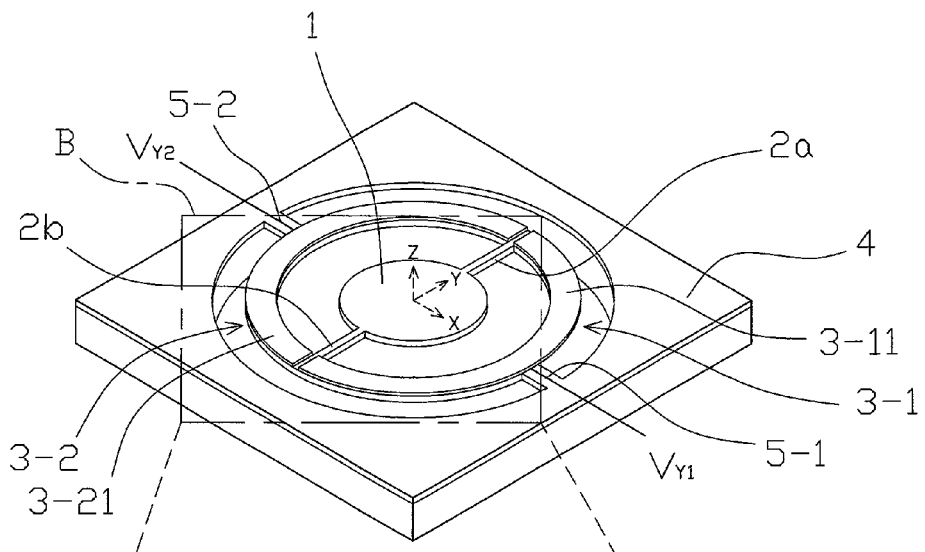
FIG. 1A is a perspective view illustrating a first prior art one-dimensional optical deflector.
Figure 1B:
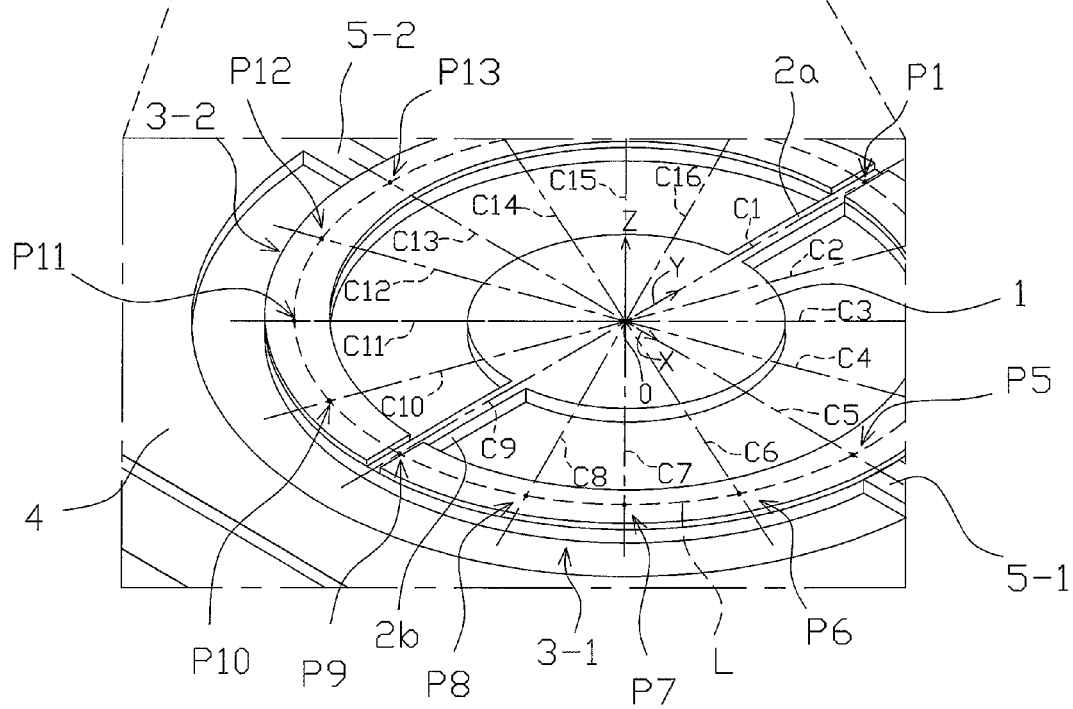
FIG. 1B is a partial enlargement of the one-dimensional optical deflector of FIG. 1A enclosed by a dotted line B in FIG. 1A.
Figure 2:
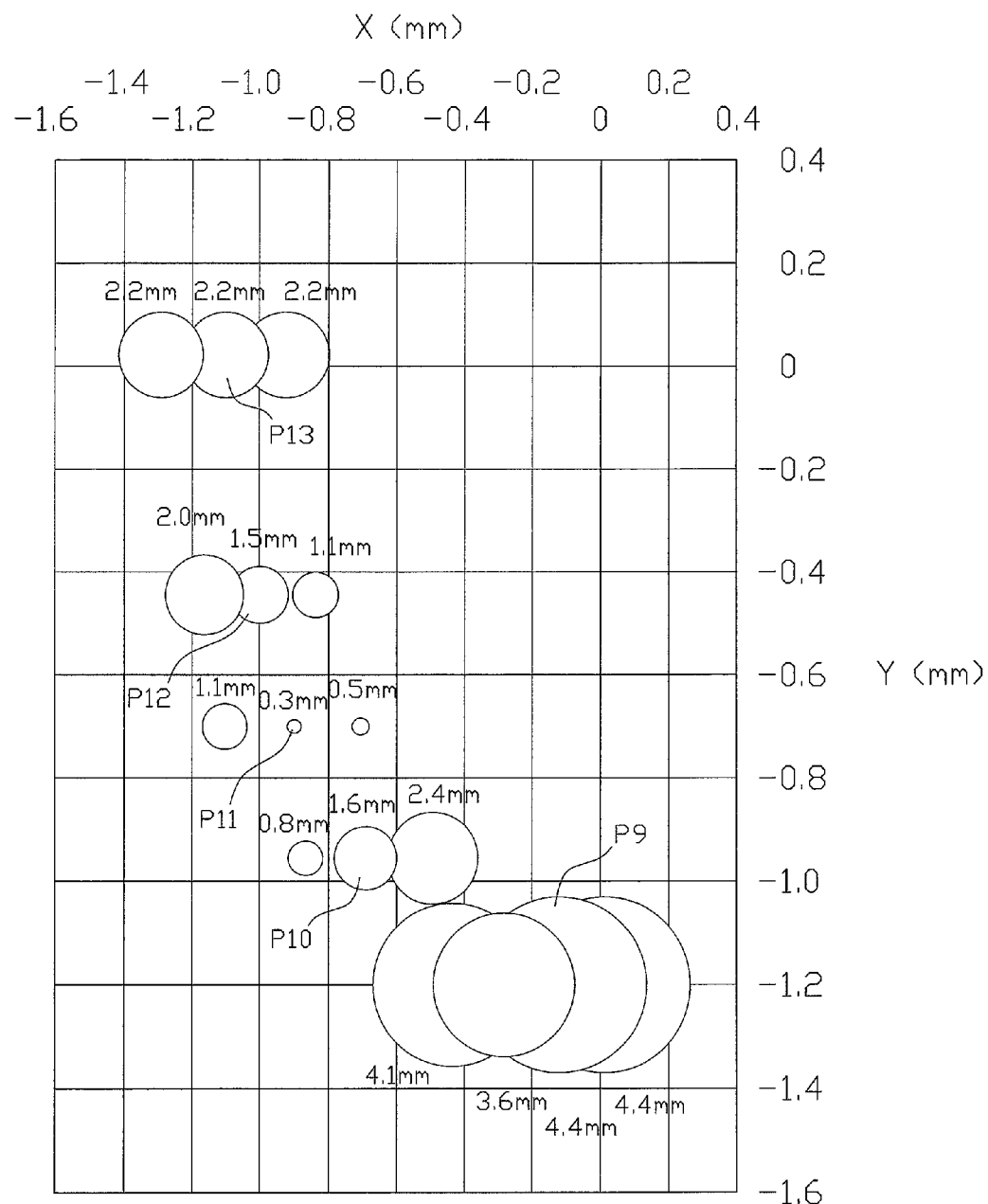
FIG. 2 is a graph showing the amplitudes of the locations of FIG. 1B.
Figure 6:
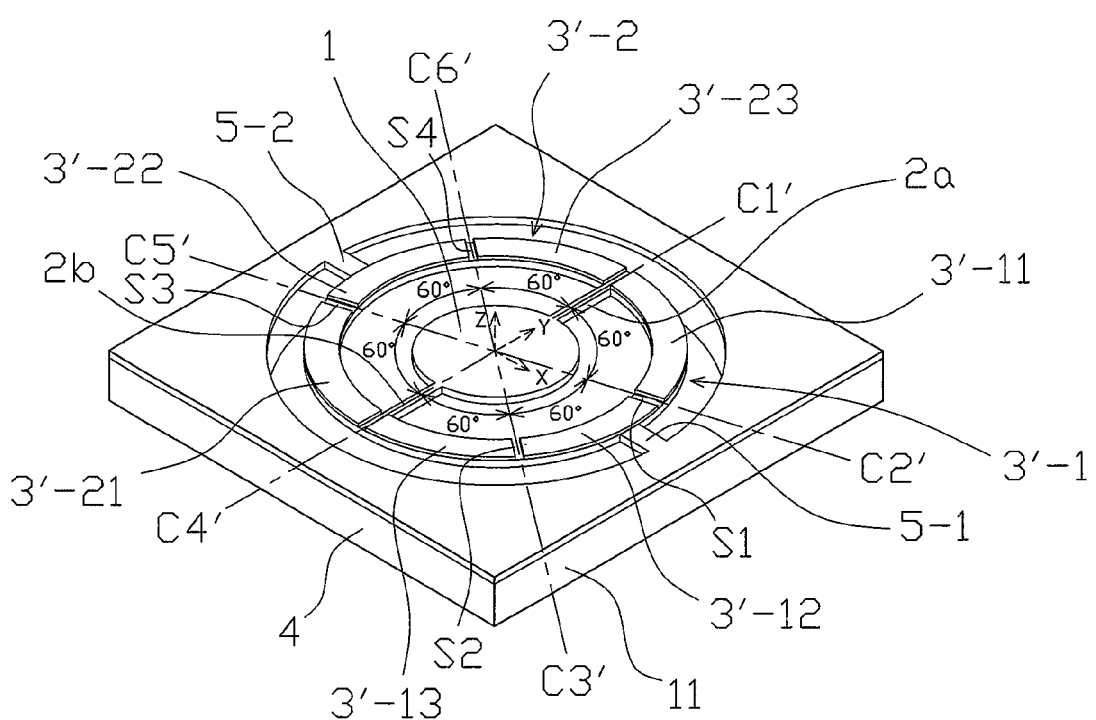
FIG. 6 is a perspective view illustrating a first embodiment of the one-dimensional optical deflector according to the presently disclosed subject matter.

In FIG. 6, which illustrates a first embodiment of the one-dimensional optical deflector according to the presently disclosed subject matter, the semi-circular piezoelectric actuators 3-1 and 3-2 of FIG. 1 are replaced by semi-circular piezoelectric actuators 3'-1 and 3'-2, respectively. Also, in FIG. 6, radial axes C1', C2', C3', C4', C5' and C6' are defined at 60° intervals centered at a point "0" on a plane of the fixed frame 4. In this case, an X-axis is defined by a radial line between the radial axes C2' and C3', and a Y-axis is defined by the radial axis C1'. Also, a Z-axis is defined to be perpendicular to the X-axis and the Y-axis.

The semi-circular piezoelectric actuator 3'-1 includes piezoelectric portions 3'-11, 3'-12 and 3'-13 made of PZT separated by slits S1 and S2 arranged on the radial axes C2' and C3', respectively. Similarly, the semi-circular piezoelectric actuator 3'-2 includes piezoelectric portions 3'-21, 3'-22 and 3'-23 made of PZT separated by slits S3 and S4 arranged on the radial axes C5' and C6', respectively.

Figure 7:
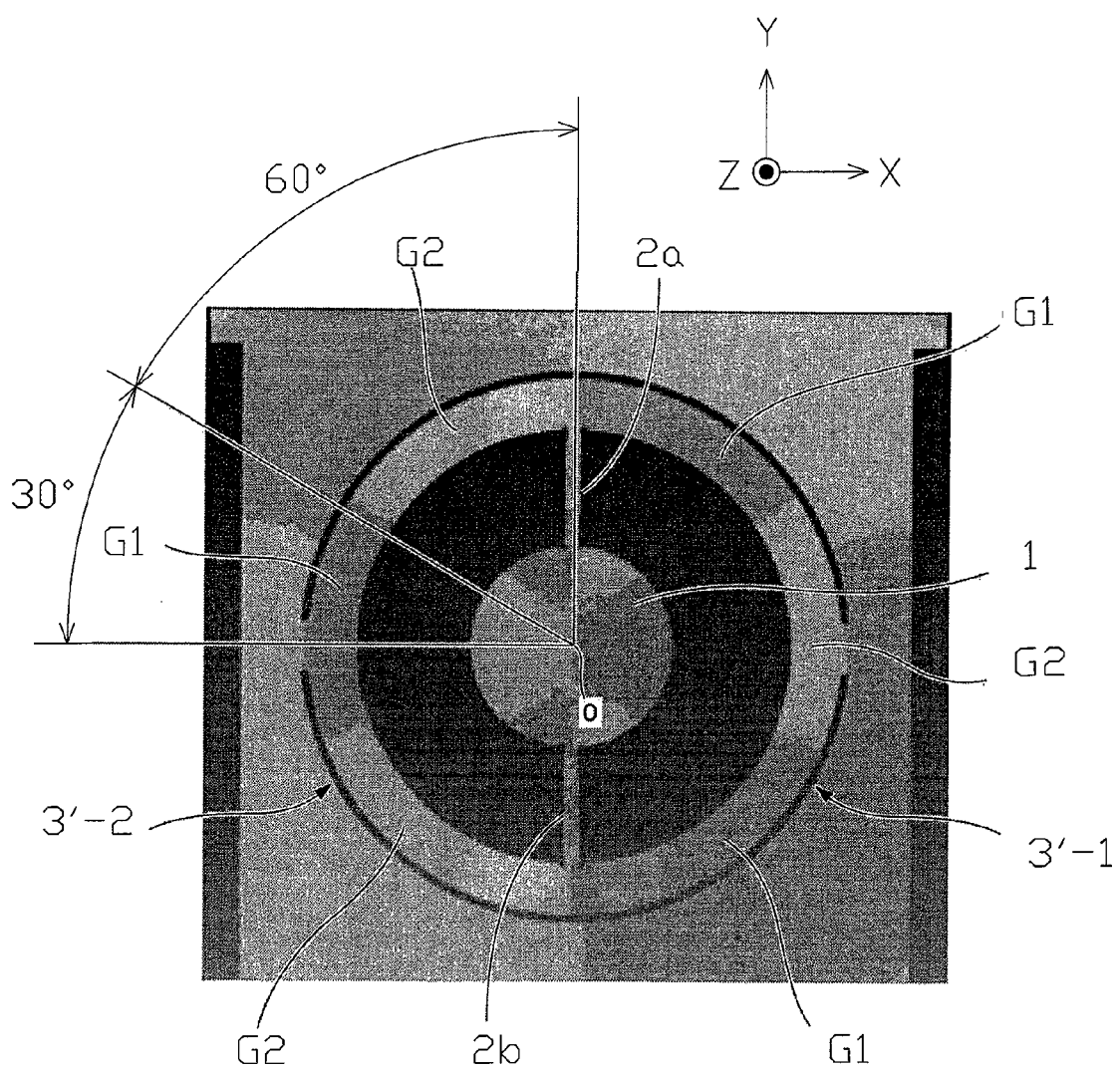
FIG. 7 is a photograph showing a polarization polarity distribution of the one-dimensional optical deflector of FIG. 6 where no slits are provided.

The positions of the slits S1, S2, S3 and S4 are determined by a polarization polarity distribution on the semi-circular piezoelectric actuators 3'-1 and 3'-2 as illustrated in FIG. 7 obtained by performing a predetermined polarization simulation upon the one-dimensional optical deflector of FIG. 6 where piezoelectric portions with no slits are hypothetically provided in the semi-circular piezoelectric actuators 3'-1 and 3'-2 and a predetermined rocking operation is performed on the mirror 1.

Figure 8:
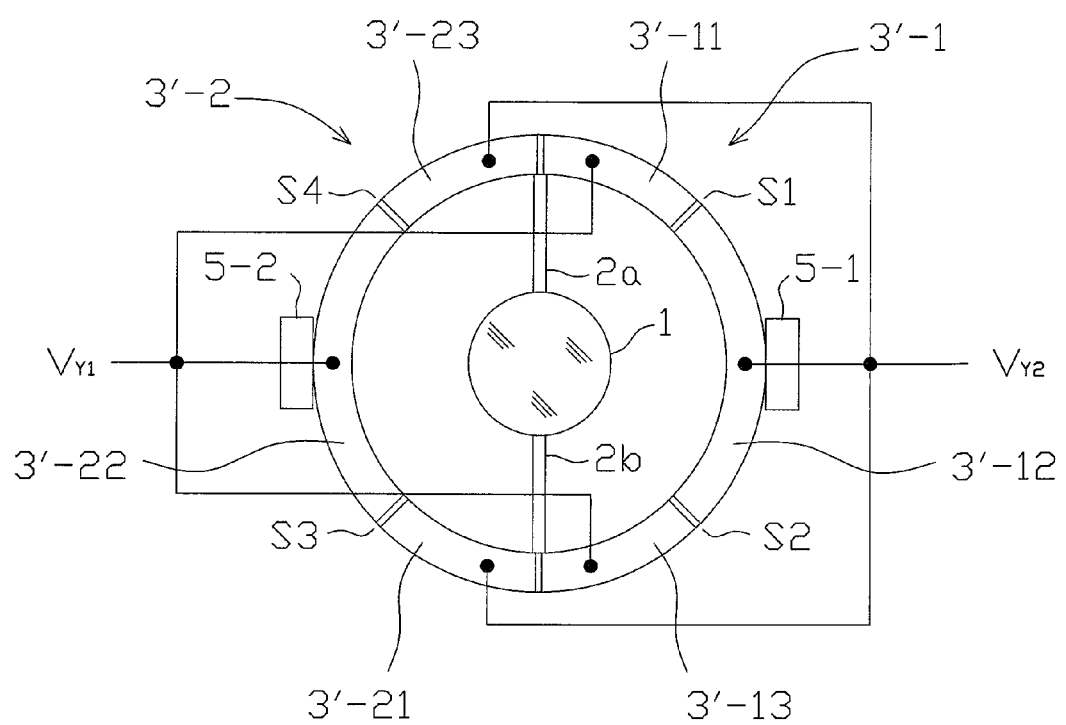
FIG. 8 is a plan view of the one-dimensional optical deflector of FIG. 6 for illustrating the drive voltages applied thereto.

In FIG. 7, the polarization polarity of polarization areas as indicated by G1 is opposite to the polarization polarity of polarization areas as indicated by G2. Note that one of the polarization polarities represents a compression stress state, while the other represents a tension stress state. That is, the positions of the slits S1, S2, S3 and S4 of FIG. 6 correspond to boundaries between the polarization polarity areas indicated by G1 and the polarization polarity areas indicated by G2 in FIG. 7. Therefore, as illustrated in FIG. 8, a drive voltage $V_{Y1}$ is applied to the piezoelectric portions 3'-11 and 3'-13 of the semi-circular piezoelectric actuator 3'-1 and the piezoelectric portion 3'-22 of the semi-circular piezoelectric actuator 3'-2, while a drive voltage $V_{Y2}$ opposite in phase to the drive voltage $V_{Y1}$ is applied to the piezoelectric portion 3'-12 of the semi-circular piezoelectric actuator 3'-1 and the piezoelectric portions 3'-21 and 3'-23 of the semi-circular piezoelectric actuator 3'-2.

Figure 3:
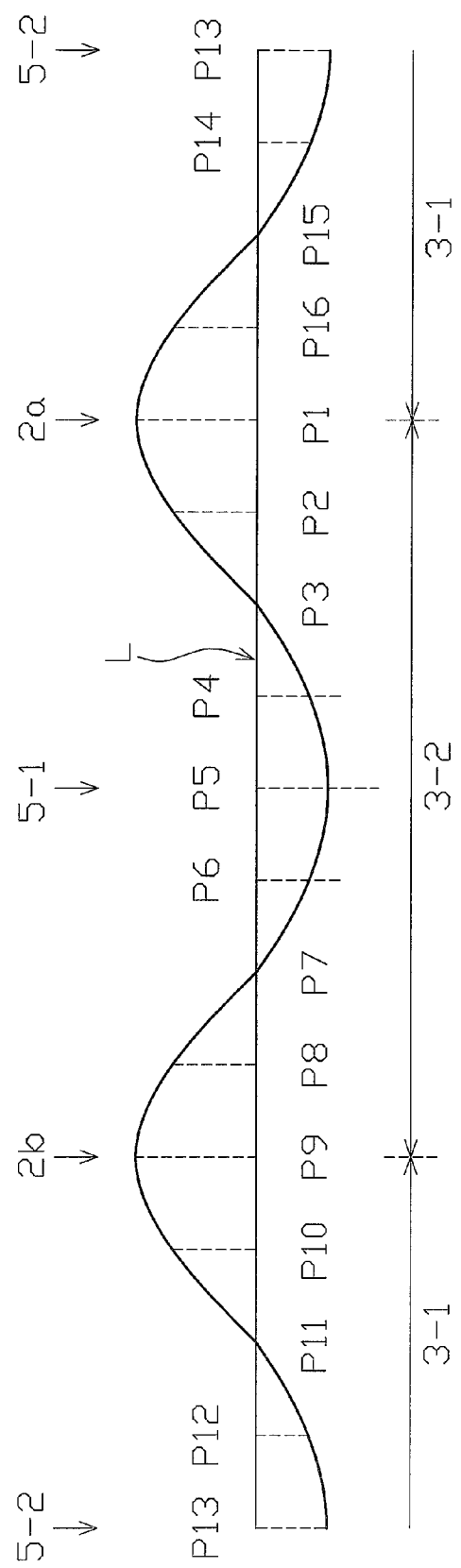
FIG. 3 is a graph showing the amplitudes at the circumferential line of the semi-circular piezoelectric actuators of FIG. 1B.
Figure 4:
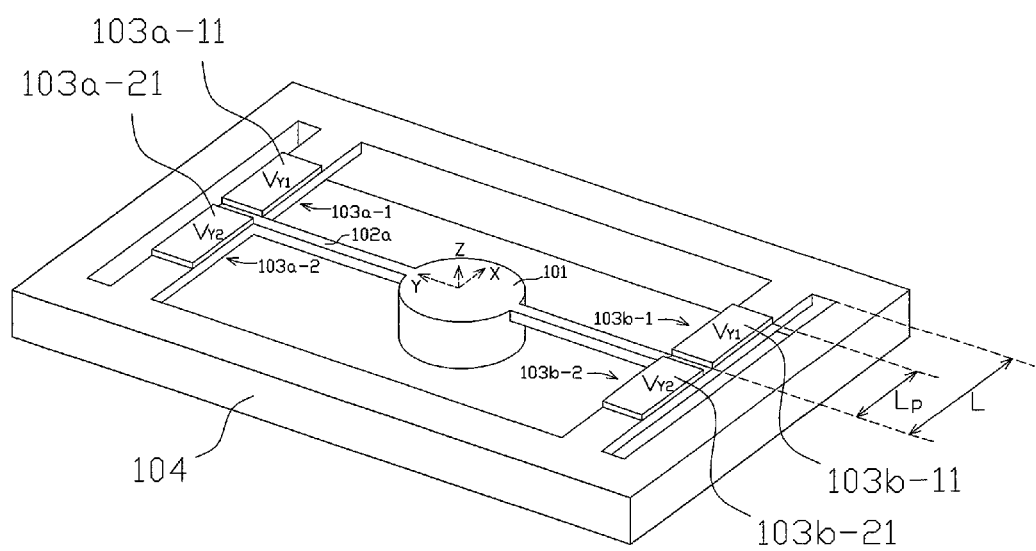
FIG. 4 is a perspective view illustrating a second prior art one-dimensional optical deflector.
Figure 5:
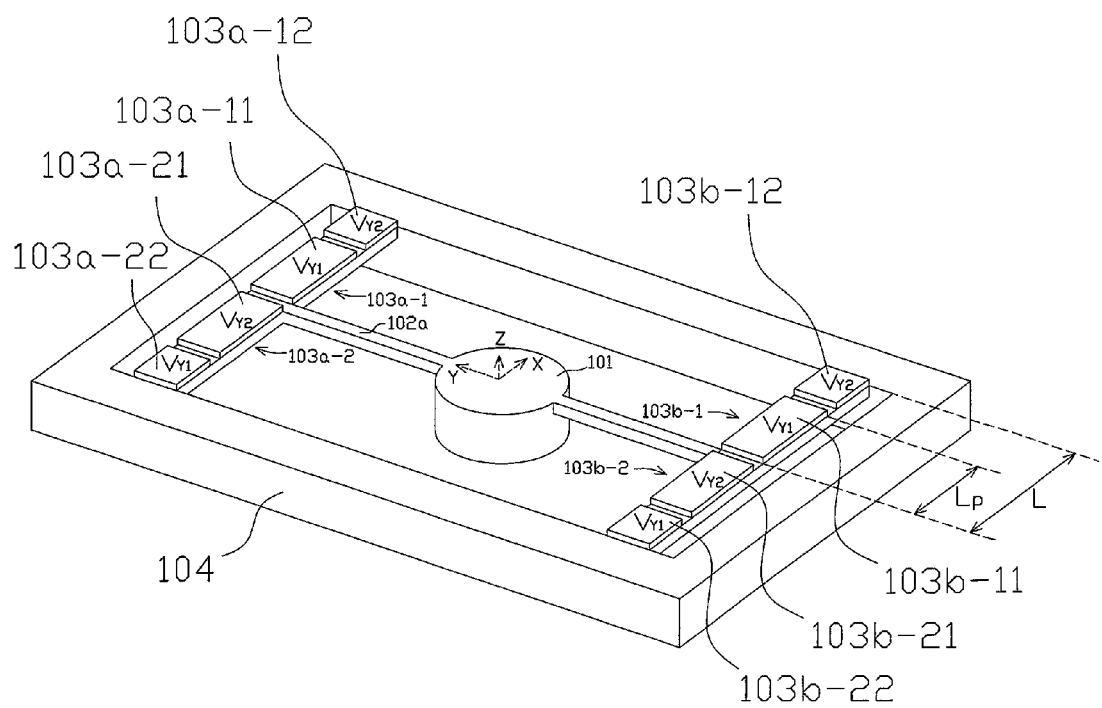
FIG. 5 is a perspective view illustrating a third prior art one-dimensional optical deflector.

Note that the boundaries between the polarization polarities of the polarization polarity distribution indicated by G1 and G2 theoretically correspond to the nodes of the resonance state as indicated by P3, P7, P11 and P15 in FIG. 3. However, these boundaries actually differ slightly from the nodes P3, P7, P11 and P15 due to the difference between the actual resonance state and the simulation.

The drive voltage $V_{Y1}$ is a sinusoidal-wave voltage whose frequency $f_R$ is a resonant frequency as illustrated in FIG. 9A, and the drive voltage $V_{Y2}$ is a sinusoidal-wave voltage as illustrated in FIG. 9B which is opposite in phase to the sinusoidal-wave drive voltage $V_{Y1}$.

In FIGS. 9A and 9B, note that the sinusoidal-wave voltages $V_{Y1}$ and $V_{Y2}$ are monopolar. As a result, the areas indicated by G1 and G2 of the semi-circular piezoelectric actuators 3'-1 and 3'-2 are moved in the same phase with respect to the Y-axis, to thereby effectively rock the mirror 1 with respect to the Y-axis.

For example, in order to realize the rocking angle of the mirror 1 by a resonant frequency $f_R$ such as about 20 kHz at a rocking angle of 10°, the amplitudes of the drive voltages $V_{Y1}$ and $V_{Y2}$ were required to be 10V in the one-dimensional optical deflector of FIG. 6, while the amplitudes of the drive voltages $V_{Y1}$ and $V_{Y2}$ were required to be 20V or more in the one-dimensional optical deflector of FIG. 1. In other words, the rocking angle of the mirror 1 by the same amplitudes of the drive voltages $V_{Y1}$ and $V_{Y2}$ can be larger in the one-dimensional optical deflector of FIG. 6 than in the one-dimensional optical deflector of FIG. 1. Also, in the one-dimensional optical deflector of FIG. 6, since the same rocking angle of the mirror 1 can be realized by smaller amplitudes of the drive voltages $V_{Y1}$ and $V_{Y2}$, the power consumption can be decreased, and the deterioration of the piezoelectric portions made of PZT can be suppressed to enhance the reliability.

The structure of each element of the optical deflector of FIG. 6 is explained next with reference to FIGS. 10A, 10B, 10C and 10D which are cross-sectional views of the optical deflector of FIG. 6. Note that FIG. 10A is a cross-sectional view of the entire optical deflector of FIG. 6, and FIGS. 10B, 10C and 10D are cross-sectional views of the semi-circular piezoelectric actuator 3'-1 (3'-2) of FIG. 6.

In FIGS. 10A and 10B, a monocrystalline silicon support layer 1001, an intermediate silicon dioxide layer 1002 and a monocrystalline silicon active layer 1003 are formed by a silicon-on-insulator (SOI) substrate. Also, reference numeral 1004 designates a silicon dioxide layer, 1005 designates a lower electrode layer of a double layer made of Ti, $TiO_2$ or $TiO_X$ (0<x<2) and Pt, $LaNiO_2$ or $SrRuO_2$, 1006 designates a PZT layer, 1007 designates an upper electrode layer made of Pt, Au or the like, and 1008 designates an about 100 to 500 nm thick metal layer made of Al, Ag, Au, Pt or the like.

The mirror 1 is constructed by the monocrystalline silicon active layer 1003 serving as a vibration plate and the metal layer 1008 serving as a reflector.

The semi-circular piezoelectric actuators 3'-1 and 3'-2 are constructed by the intermediate silicon layer 1002, the monocrystalline silicon active layer 1003, the silicon dioxide layer 1004, the lower electrode layer 1005, the PZT layer 1006 and the upper electrode layer 1007. Particularly, the lower electrode layer 1005, the PZT layer 1006 and the upper electrode layer 1007 form the piezoelectric portions 3'-11, 3'-12, 3'-13, 3'-21, 3'-22 and 3'-23.

The fixed frame 4 is constructed by the monocrystalline silicon layer 1001, the intermediate silicon layer 1002, the monocrystalline silicon active layer 1003 and the silicon dioxide layer 1004.

Note that the semi-circular piezoelectric actuators 3'-1 (3'-2) can entirely include the lower electrode layer 1005 as illustrated in FIG. 10C, or can entirely include the lower electrode layer 1005 and the PZT layer 1006 as illustrated in FIG. 10D. In FIGS. 10C and 10D, portions of the PZT layer 1006 without the upper electrode layer 1007 are inactivated, so that the semi-circular piezoelectric actuators 3'-1 (3'-2) of FIG. 10C or 10D can serve as the semi-circular piezoelectric actuators 3'-1 (3'-2) of FIG. 10B.

The structure of the one-dimensional optical deflector as illustrated in FIG. 10 can be manufactured by semiconductor manufacturing technology and micro electro mechanical systems (MEMS) technology (see: JP 2009-169326 and JP 2009-223165).

A method for designing the one-dimensional optical deflector of FIG. 6 is as follows.

First, a one-dimensional optical deflector of FIG. 6 without slits S1, S2, S3 and S4 is designed. In this case, piezoelectric portions are provided at least on the piezoelectric actuators 3'-1 and 3'-2.

Next, a predetermined polarization simulation is performed upon the designed one-dimensional deflector without slits S1, S2, S3 and S4 to obtain a polarization polarity distribution as illustrated in FIG. 7 while a predetermined rocking operation is performed upon the mirror 1.

Next, the locations of the slits S1, S2, S3 and S4 are determined in accordance with boundaries between the polarization polarity areas of the polarization polarity distribution.

Finally, the piezoelectric portions 3'-11, 3'-12, 3'-13, 3'-21, 3'-22 and 3'-23 are determined in accordance with the slits S1, S2, S3 and S4.

Figure 11:
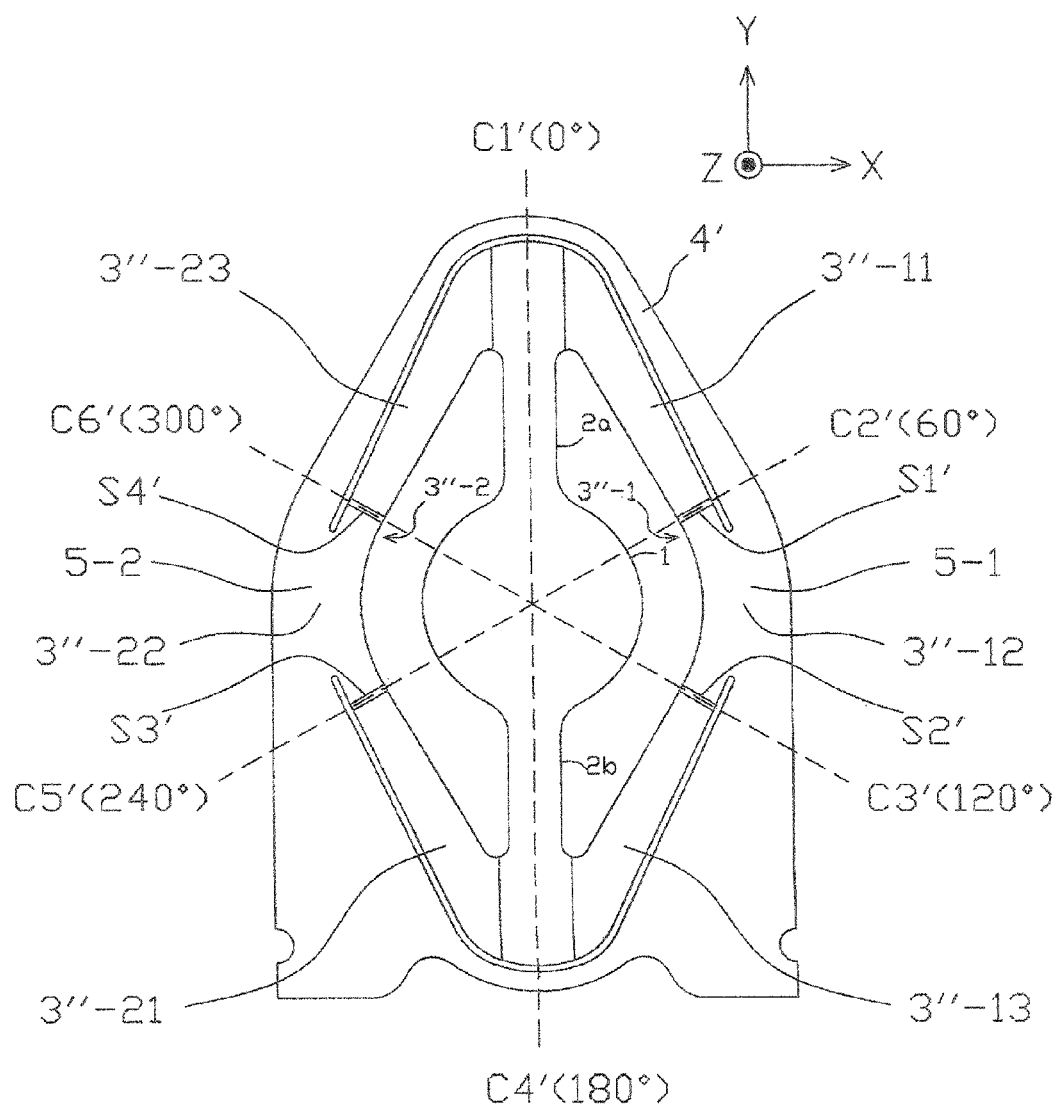
FIG. 11 is a plan view illustrating a second embodiment of the one-dimensional optical deflector according to the presently disclosed subject matter.

In FIG. 11, which illustrates a second embodiment of the one-dimensional optical deflector according to the presently disclosed subject matter, a semi-diamond (or semi-lozenge)-shaped piezoelectric actuator 3"-1 including piezoelectric portions 3"-11, 3"-12 and 3"-13 and a semi-diamond-shaped piezoelectric actuator 3"-2 including piezoelectric portions 3"-21, 3"-22 and 3"-23 and a diamond-shaped fixed frame 4' are provided instead of the semiconductor piezoelectric actuator 3'-1 including the piezoelectric portions 3'-11, 3'-12 and 3'-13 and the semi-circular piezoelectric actuator 3'-2 including piezoelectric portions 3'-21, 3'-22 and 3'-23 and the rectangular fixed frame 4, respectively, of FIG. 6.

Figure 12:
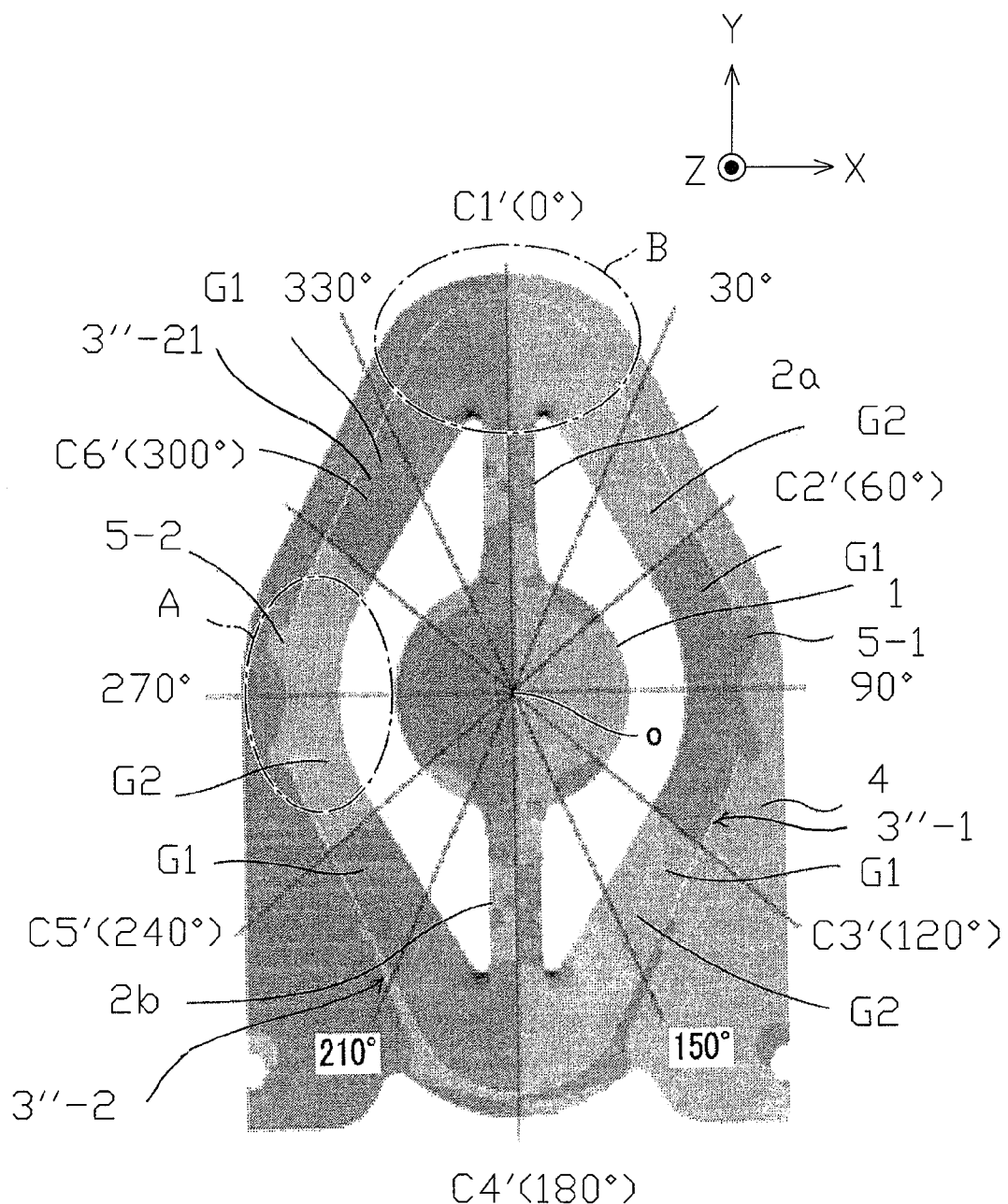
FIG. 12 is a photograph showing a polarization polarity distribution of the one-dimensional optical deflector of FIG. 11 where no slits are provided.

In FIG. 11, the width of the semi-diamond-shaped piezoelectric actuators 3'-1 and 3"-2 is gradually increased from the coupling portions 5-1 and 5-2 as indicated by A (see: FIG. 12) to the torsion bars 2a and 2b as indicated by B (see: FIG. 12). As a result, since the areas of the piezoelectric portions 3"-11, 3"-12, 3"-13, 3"-21, 3"-22 and 3"-23 are increased around the torsion bars 2a and 2b, the rocking angle of the mirror 1 can be increased under the same drive voltage $V_{y1}$ and $V_{y2}$.

The piezoelectric portions 3"-11, 3'-12 and 3'-13 made of PZT are separated by slits S1' and S2' arranged on the radial axes C2' and C3', respectively. Similarly, the piezoelectric portions 3'-21, 3"-22 and 3"-23 made of PZT are separated by slits S3' and S4' arranged on the radial axes C5" and C6", respectively.

The positions of the slits S1', S2', S3' and S4' are determined by a polarization polarity distribution on the semi-diamond-shaped piezoelectric actuators 3"-1 and 3"-2 as illustrated in FIG. 12 obtained by performing a predetermined polarization simulation upon the one-dimensional optical deflector of FIG. 11 where piezoelectric portions with no slits are hypothetically provided in the semi-diamond-shaped piezoelectric actuators 3"-1 and 3"-2 and a predetermined rocking operation is performed on the mirror 1.

Even in FIG. 12, the polarization polarity of polarization areas as indicated by G1 is opposite to the polarization polarity of polarization areas as indicated by G2. That is, the positions of the slits S1', S2', S3' and S4' of FIG. 11 correspond to boundaries between the polarization areas indicated by G1 and the polarization areas indicated by G2 in FIG. 12. Therefore, in the same way as in FIG. 8, a sinusoidal-wave drive voltage $V_{y1}$ is applied to the piezoelectric portions 3"-11 and 3"-13 of the semi-diamond-shaped piezoelectric actuator 3"-1 and the piezoelectric portion 3"-22 of the semi-diamond-shaped piezoelectric actuator 3"-2, while a sinusoidal-wave drive voltage $V_{y2}$ opposite in phase to the drive voltage $V_{y1}$ is applied to the piezoelectric portion 3"-12 of the semi-diamond-shaped piezoelectric actuator 3"-1 and the piezoelectric portions 3"-21 and 3'-23 of the semi-diamond-shaped piezoelectric actuator 3"-2. As a result, the areas indicated by G1 and G2 of the semi-diamond-shaped piezoelectric actuators 3"-1 and 3"-2 are moved in the same phase with respect to the Y-axis, thereby to effectively rock the mirror 1 with respect to the Y-axis.

The structure of the one-dimensional optical deflector of FIG. 11 is similar to that of the one-dimensional optical deflector of FIG. 6 as illustrated in FIG. 10. Also, the method for designing the one-dimensional optical deflector of FIG. 11 is similar to the method for designing the one-dimensional optical deflector of FIG. 6.

Figure 13:
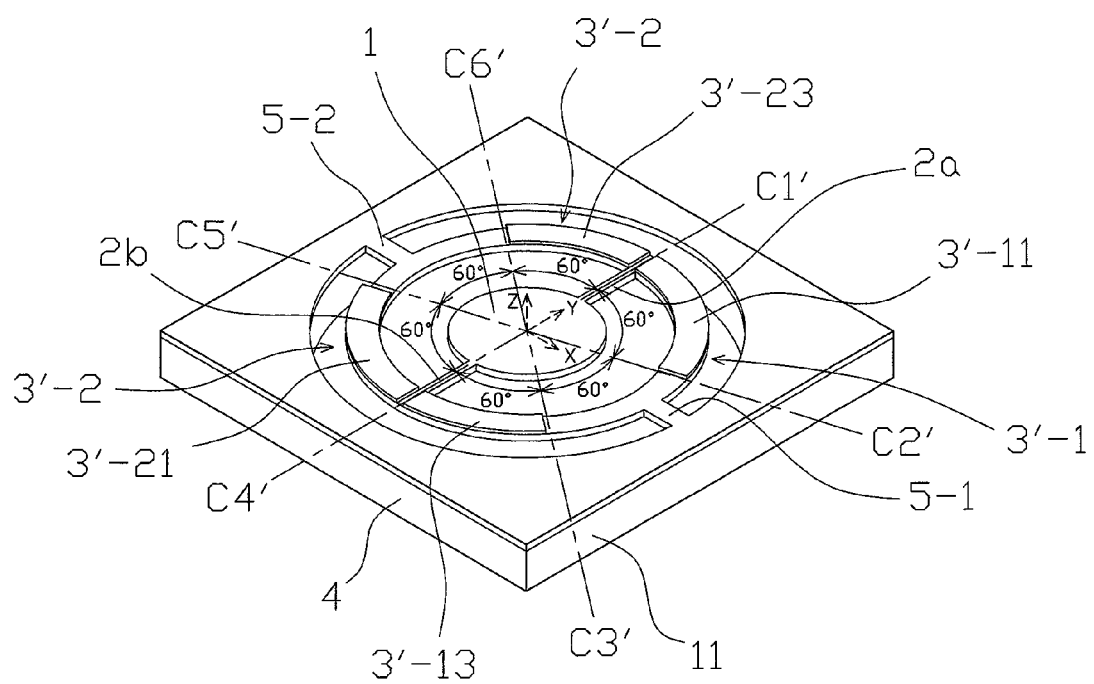
FIG. 13 is a perspective view illustrating a third embodiment of the one-dimensional optical deflector according to the presently disclosed subject matter.

In FIG. 13, which illustrates a third embodiment of the one-dimensional optical deflector according to the presently disclosed subject matter, the piezoelectric portions 3'-12 and 3'-22 are removed from the semi-circular piezoelectric actuators 3'-1 and 3'-2 of FIG. 6.

Figure 14:
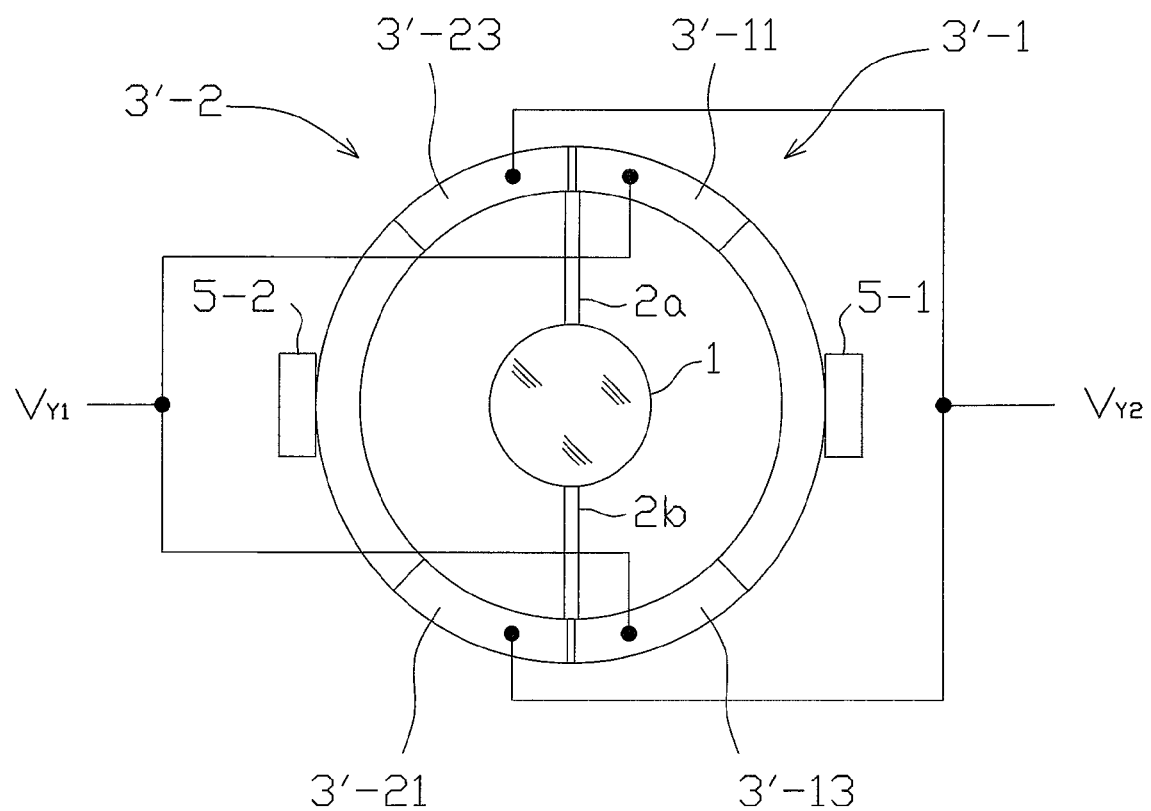
FIG. 14 is a plan view of the one-dimensional optical deflector of FIG. 13 for illustrating the drive voltages applied thereto.

Therefore, as illustrated in FIG. 14, a sinusoidal-wave drive voltage $V_{y1}$ as illustrated in FIG. 9A is applied to the piezoelectric portions 3'-11 and 3'-13 of the semi-circular piezoelectric actuator 3'-1, while a sinusoidal-wave drive voltage $V_{y2}$ as illustrated in FIG. 9B opposite in phase to the drive voltage $V_{y1}$ is applied to the piezoelectric portions 3'-21 and 3'-23 of the semi-circular piezoelectric actuator 3'-2. As a result, the areas indicated by G1 and G2 of the semi-circular piezoelectric actuators 3'-1 and 3'-2 are moved in the same phase with respect to the Y-axis, thereby to effectively rock the mirror 1 with respect to the Y-axis.

For example, in order to realize the rocking angle of the mirror 1 by a resonant frequency $f_R$ such as about 20 kHz at a rocking angle of 10°, the amplitudes of the drive voltages $V_{y1}$ and $V_{y2}$ were required to be 11 to 12V in the one-dimensional optical deflector of FIG. 13. Therefore, in the same way as in the one-dimensional optical deflector of FIG. 6, the power consumption can be decreased, and the deterioration of the piezoelectric portions made of PZT can be suppressed to enhance the reliability.

The structure of the one-dimensional optical deflector of FIG. 13 is similar to that of the one-dimensional optical deflector of FIG. 6 as illustrated in FIG. 10. Also, the method for designing the one-dimensional optical deflector of FIG. 13 is similar to the method for designing the one-dimensional optical deflector of FIG. 6.

Note that the one-dimensional optical deflector of FIG. 6 where no drive voltage is applied to the piezoelectric portions 3'-12 and 3'-22 can be used as the one-dimensional optical deflector of FIGS. 13 and 14. In this case, no drive voltage is applied to the piezoelectric portion 3'-12 of the semi-circular piezoelectric actuator 3'-1 and the piezoelectric portion 3'-22 of the semi-circular piezoelectric actuator 3'-2.

Figure 15:
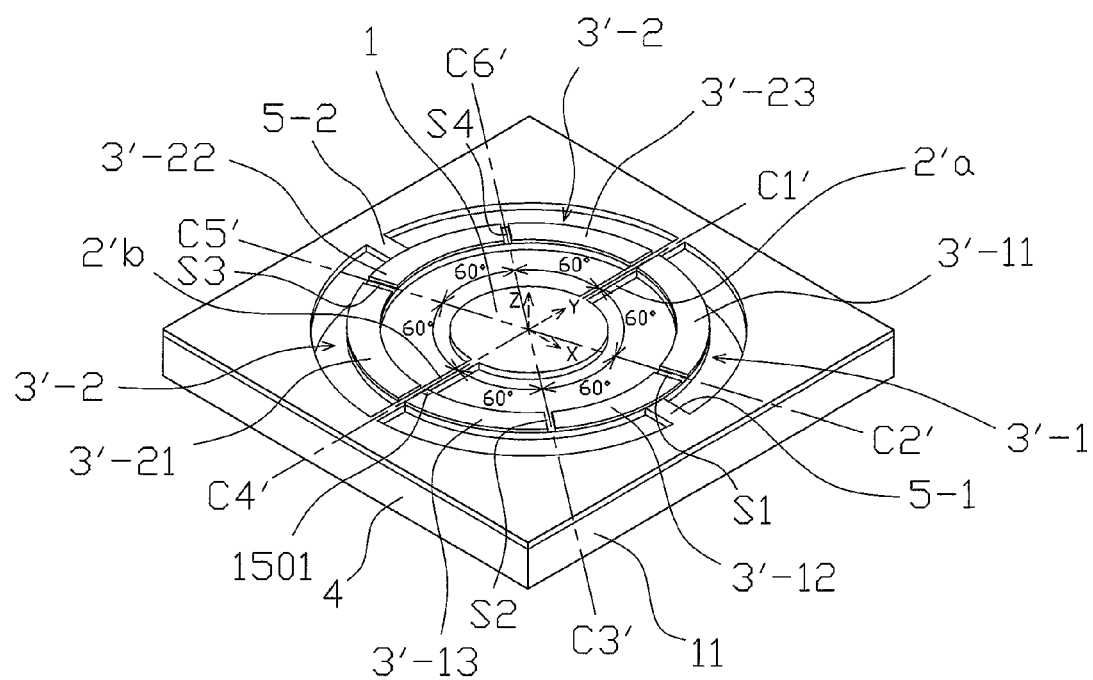
FIG. 15 is a plan view illustrating a fourth embodiment of the one-dimensional optical deflector according to the presently disclosed subject matter.

In FIG. 15, which illustrates a fourth embodiment of the one-dimensional optical deflector according to the presently disclosed subject matter, torsion bars 2'a and 2'b are provided instead of the torsion bars 2a and 2b, respectively, of FIG. 6. Since the torsion bars 2'a and 2'b are coupled between the outer circumference of the mirror 1 and the inner circumference of the fixed frame 4 through the semi-circular piezoelectric actuators 3'-1 and 3'-2, the torsion bars 2'a and 2'b can be stably twisted by the piezoelectric actuators 3'-1 and 3'-2. Also, since the mirror 1 is supported by a four-point support at the fixed frame 4, the support of the mirror 1 is more stable in the one-dimensional optical deflector of FIG. 15 than in the one-dimensional optical deflector of FIG. 6.

In FIG. 15, a piezoelectric sensor 1501 is provided at a portion crossing between the torsion bar 2b and the semi-circular piezoelectric actuator 3'-1.

Figure 16:
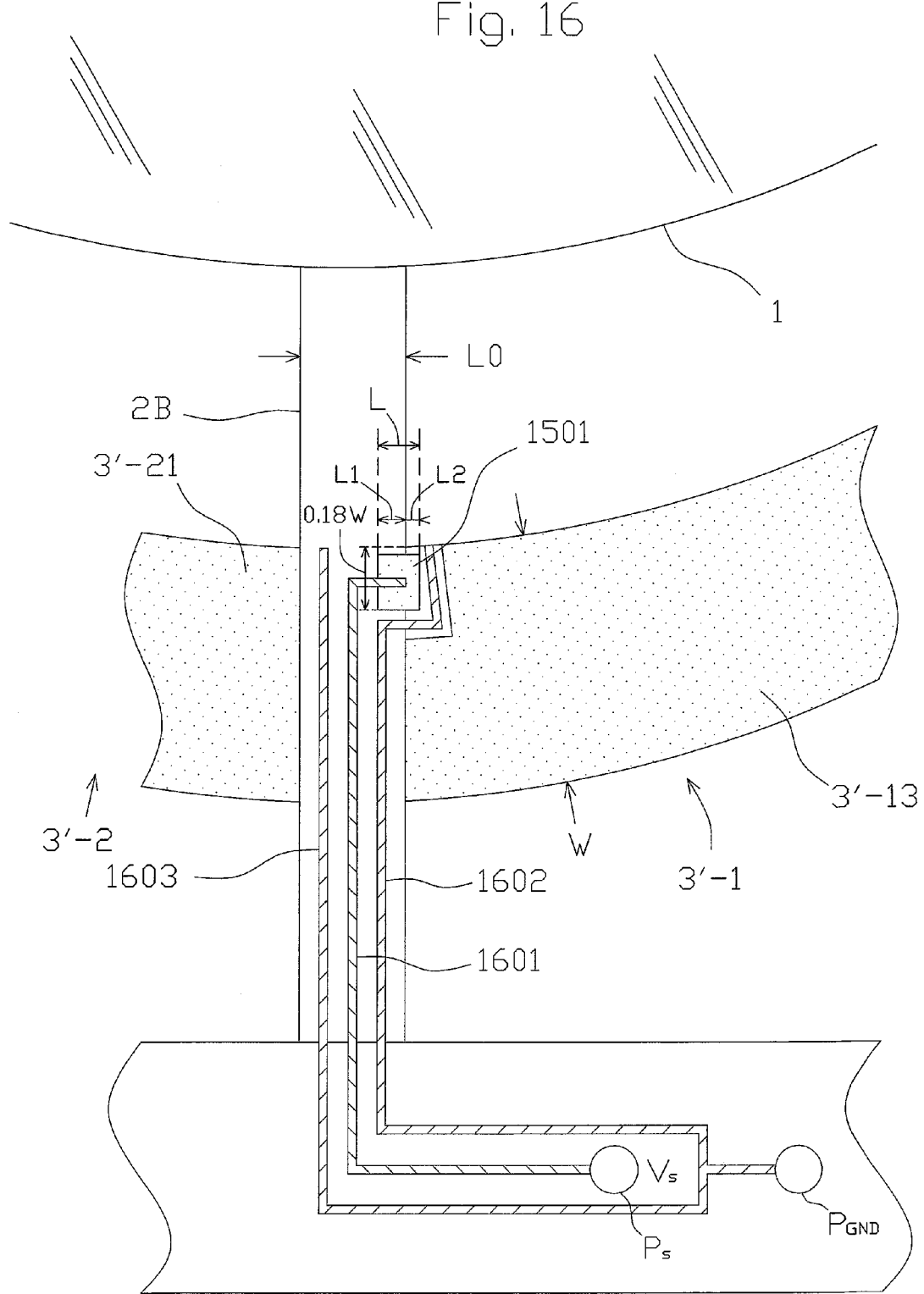
FIG. 16 is a partial enlargement of the one-dimensional optical deflector of FIG. 15 near the piezoelectric sensor.

In FIG. 16, which is a partial enlargement of the optical deflector of FIG. 15 near the piezoelectric sensor 1501, the piezoelectric sensor 1501 is constructed by the lower electrode layer 1005, the PZT layer 1006 and the upper electrode layer 1007 in the same way as those of FIG. 10, in order to sense rocking vibrations of the torsion bar 2b caused by the semi-circular piezoelectric actuator 3'-1. In this case, the piezoelectric sensor 1501 senses a strong stress due to the rocking vibrations of the torsion bar 2b which would be concentrated at an inner side portion of the semi-circular piezoelectric actuator 3'-1 in the vicinity of the torsion bar 2b.

The piezoelectric sensor 1501 has a length L which is defined by $$L=L1+L2$$

$$L1=L0/8$$

$$L2 \leq L0/8$$

where L1 is a distance between the inner edge of the piezoelectric sensor 1501 and an edge of the torsion bar 2b on the side of the semi-circular piezoelectric actuator 3'-1;

L2 is a distance between the outer edge of the piezoelectric sensor 1501 and the edge of the torsion bar 2b on the semi-circular piezoelectric actuator 3'-1; and L0 is a width of the torsion bar 2b.

Also, if W is defined by a width of the semi-circular piezoelectric actuator 3'-1, the piezoelectric sensor 1501 is arranged at a width portion having a width of less than 0.18·W from the inner circumference of the semi-circular piezoelectric actuator 3'-1.

A sense conductive layer 1601 is connected from the upper electrode layer (not shown) of the piezoelectric sensor 1501 over the torsion bar 2b to a sense pad $P_S$ on the fixed frame 4.

Two ground conductive layers 1602 and 1603 are arranged to sandwich the sense conductive layer 1601, so that the sense conductive layer 1601 is electrostatically shielded by the ground conductive layers 1602 and 1603, thus preventing the sense conductive layer 1601 from crosstalking with the drive voltages $V_{Y1}$ and $V_{Y2}$ at the piezoelectric portion 3'-13 of the semi-circular piezoelectric actuator 3'-1 and the piezoelectric portion 3'-21 of the semi-circular piezoelectric actuator 3'-2. The ground conductive layers 1602 and 1603 are connected over the torsion bar 2b to a ground pad $P_{GND}$ on the fixed frame 4.

A sense voltage $V_S$ of the piezoelectric sensor 1501 is supplied from the sense conductive layer 1601 to the sense pad $P_S$, and then is supplied to a control unit (not shown) which controls the drive voltages $V_{Y1}$ and $V_{Y2}$. Therefore, the frequency of the drive voltages $V_{Y1}$ and $V_{Y2}$ is controlled by the control unit, so that the sense voltage $V_S$ is brought close to its maximum value, thus realizing a resonance state.

The structure of the one-dimensional optical deflector of FIG. 15 is similar to that of the one-dimensional optical deflector of FIG. 6 as illustrated in FIG. 10. Also, the method for designing the one-dimensional optical deflector of FIG. 15 is similar to the method for designing the one-dimensional optical deflector of FIG. 6.

Figure 17:
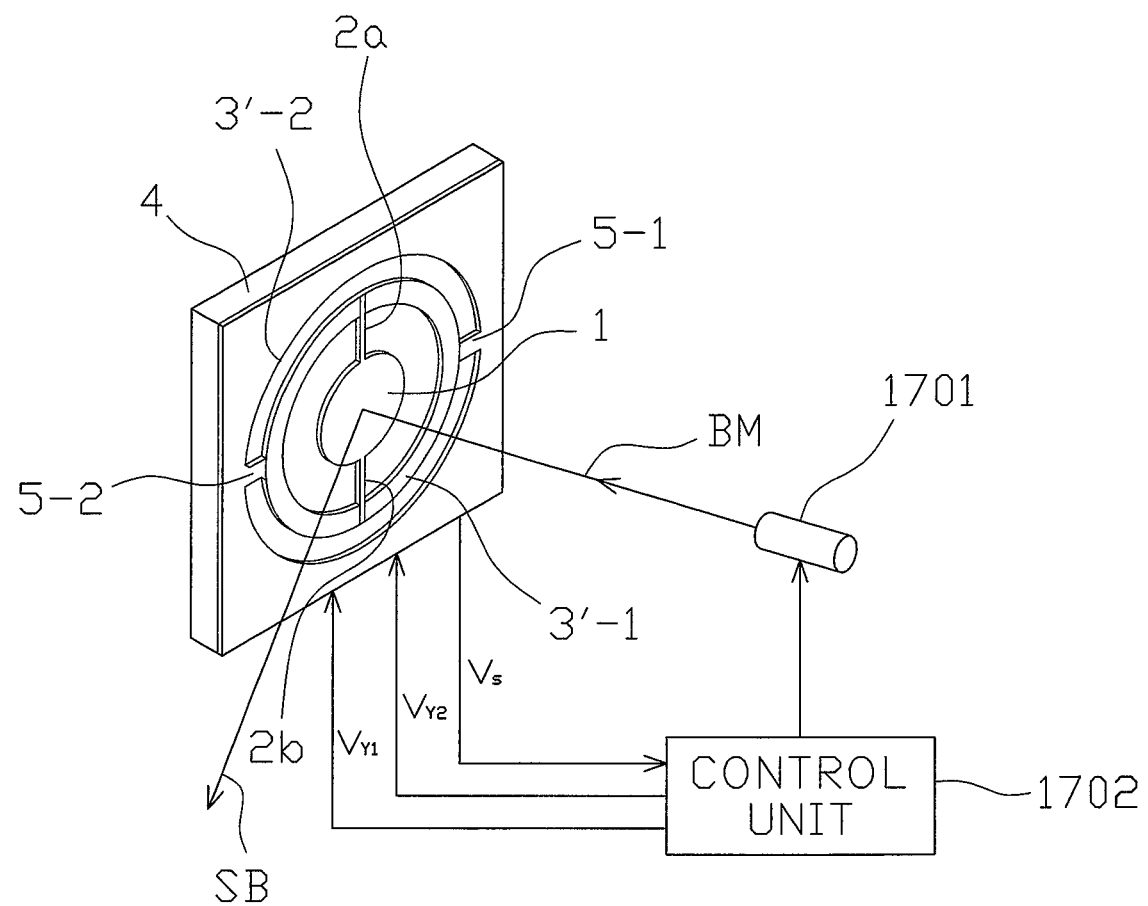
FIG. 17 is a view illustrating a light scanning system including the one-dimensional optical deflector of FIG. 6.

The one-dimensional optical deflector of FIG. 6 is applied to a light scanning system as illustrated in FIG. 17. In FIG. 17, a light source 1701 emits a light beam BM and transmits it to the mirror 1 of the one-dimensional optical deflector of FIG. 6. A control unit 1702 controls the light source 1701, so that the control unit 1702 turns ON and OFF the light source 1701, as occasion demands. Also, the control unit 1702 controls the sinusoidal-wave drive voltages $V_{Y1}$ and $V_{Y2}$ as illustrated in FIGS. 9A and 9B in accordance with a sense voltage $V_S$ outputted from the piezoelectric sensor (not shown) of the one-dimensional optical deflector, and transmits them to the piezoelectric portions of the piezoelectric actuators 3'-1 and 3'-2. For example, the control unit 1702 turns ON the light source 1701 for a half period of the sinusoidal-wave voltage $V_{Y1}$ and turns OFF the light source 1701 for the other half period of the sinusoidal-wave voltage $V_{Y1}$. As a result, the light beam BM is reflected by the mirror 1 to emit a scanning light beam SB. Note that the control unit 1702 is constructed by a microcomputer including a central processing unit (CPU), a read-only memory (ROM), a random access memory (RAM) and the like.

Note that the one-dimensional optical deflector of FIG. 11, 13 or 15 can also be applied to the light scanning system of FIG. 17.

In the above-described embodiments, the mirror 1 is circular; however, the mirror 1 can be an ellipse.

Figure 18:
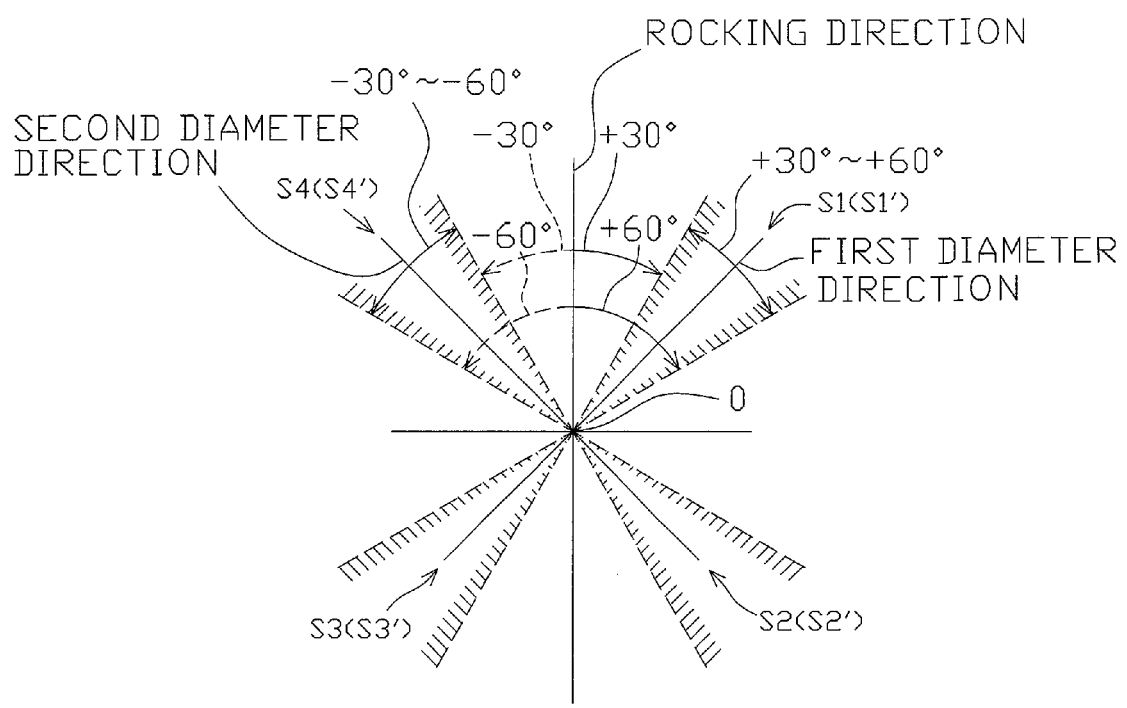
FIG. 18 is a view for explaining the directions of the slits of FIG. 6.

Also, the slits S1, S2, S3 and S4 (S1', S2', S3' and S4') are arranged along a 60°, 120°, 240° and 300°-angled direction with respect to the rocking direction of the mirror 1. However, as illustrated in FIG. 18, the slit S1 (S1') can be arranged along a first radial direction which is +30° to +60°-angled with respect to the rocking direction, the slit S2 (S2') can be arranged along a second radial direction which is +120° to +150°-angled with respect to the rocking direction, the slit S3 (S3') can be arranged along a third radial direction which is +210° to +240°-angled with respect to the rocking direction, and the slit S4 (S4') can be arranged along a fourth radial direction which is +300° to +330°-angled with respect to the rocking direction. In other words, the slits S1 and S3 (S1' and S3') are arranged along a first diameter direction which is obtained by inclining the rocking direction (axis) by a first predetermined angle between +30° and +60°, while the slits S2 and S4 (S2' and S4') are arranged along a second diameter direction which is obtained by inclining the rocking direction (axis) by a second predetermined angle between −30° and −60°.

Figure 19:
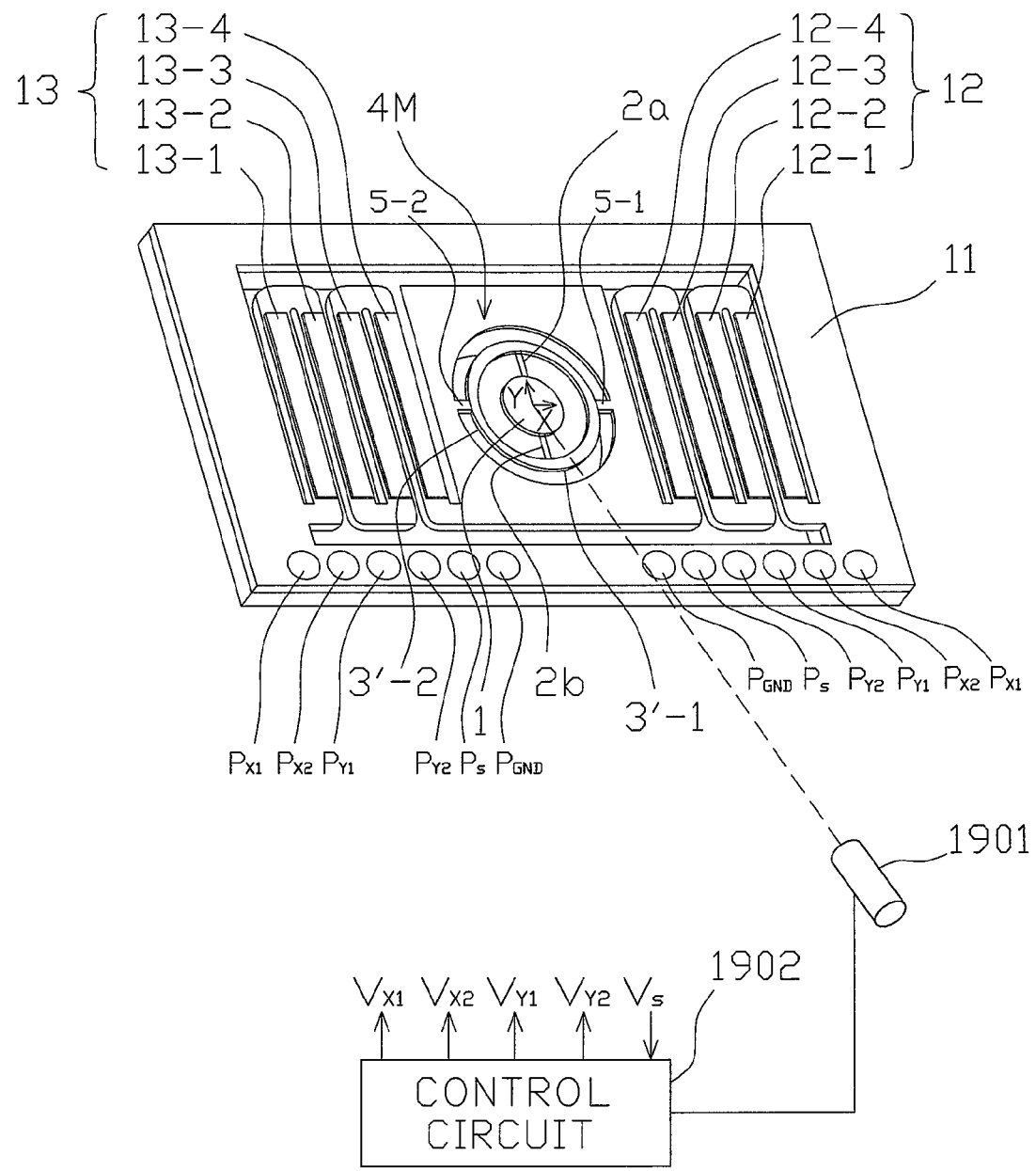
FIG. 19 is a plan view illustrating a two-dimensional optical deflector to which the one-dimensional optical deflector of FIG. 6 is applied.

In FIG. 19, which is a perspective view illustrating a two-dimensional optical deflector to which the one-dimensional optical deflector of FIG. 6 is applied, the rectangular fixed frame 4 of FIG. 6 serves as a movable frame 4M. Also, a rectangular fixed frame 11 is provided to surround the movable frame 4M. Further, a pair of outer meander-type piezoelectric actuators 12 and 13 between the fixed frame 11 and the movable frame 4M and serving as cantilevers for rocking the mirror 1 around the X-axis. The piezoelectric actuators 12 and 13 are arranged opposite to each other with respect to the X-axis.

The outer piezoelectric actuator 12 is constructed by piezoelectric cantilevers 12-1, 12-2, 12-3 and 12-4 which are serially-coupled from the fixed frame 11 to the movable frame 4M. Also, each of the piezoelectric cantilevers 12-1, 12-2, 12-3 and 12-4 are in parallel with the Y-axis. Therefore, the piezoelectric cantilevers 12-1, 12-2, 12-3 and 12-4 are folded at every cantilever or meandering from the fixed frame 11 to the movable frame 4M, so that the amplitudes of the piezoelectric cantilevers 12-1, 12-2, 12-3 and 12-4 can be changed along directions perpendicular to the X-axis.

Similarly, the outer piezoelectric actuator 13 is constructed by piezoelectric cantilevers 13-1, 13-2, 13-3 and 13-4 which are serially-coupled from the fixed frame 11 to the movable frame 4M. Also, each of the piezoelectric cantilevers 13-1, 13-2, 13-3 and 13-4 are in parallel with the Y-axis. Therefore, the piezoelectric cantilevers 13-1, 13-2, 13-3 and 13-4 are folded at every cantilever or meandering from the fixed frame 11 to the movable frame 4M, so that the amplitudes of the piezoelectric cantilevers 13-1, 13-2, 13-3 and 13-4 can be changed along directions perpendicular to the X-axis.

Note that the number of piezoelectric cantilevers in each of the outer piezoelectric actuators 12 and 13 can be other values such as 2, 6, 8, ....

Also, provided on the fixed frame 11 are pads $P_{X1}$ and $P_{X2}$. The pads $P_{X1}$ and $P_{X2}$ are connected to a control unit 1901 which applies a drive voltage $V_{X1}$ to the pad $P_{X1}$, and applies a drive voltage $V_{X2}$ to the pad $P_{X2}$. In this case, the drive voltages $V_{X1}$ and $V_{X2}$ opposite in phase to each other are saw-tooth-shaped, and have a frequency of 15 kHz.

The pad $P_{X1}$ is connected via conductive layers (not shown) to the upper electrode layers of the odd-numbered piezoelectric cantilevers 12-1, 12-3, 13-1 and 13-3 of the outer piezoelectric actuators 12 and 13.

The pad $P_{X2}$ is connected via conductive layers to the upper electrode layers of the even-numbered piezoelectric cantilevers 12-2, 12-4, 13-2 and 13-4 of the outer piezoelectric actuators 12 and 13.

Further, provided on the frame 11 are pads $P_{Y1}$, $P_{Y2}$, $P_S$ and $P_{GND}$.

The pad $P_{Y1}$ is connected via conductive layers (not shown) to the upper electrode layer of the semi-circular piezoelectric actuator 3'-1.

The pad $P_{Y2}$ is connected via conductive layers (not shown) to the upper electrode layer of the semi-circular piezoelectric actuator 3'-2.

The pad $P_S$ is connected via conductive layers (not shown) to the upper electrode layer of the piezoelectric sensor (not shown).

The pad $P_{GND}$ is connected via conductive layers (not shown) to the lower electrode layers of all the piezoelectric actuators and the piezoelectric sensor.

In FIG. 19, a light source 1901 corresponding to the light source 1701 of FIG. 17 and a control unit 1902 corresponding to the control unit 1702 of FIG. 17 are provided. The control unit 1902 further controls the drive voltages $V_{Y1}$ and $V_{Y2}$ in accordance with the sense voltage $V_S$ and also, controls the drive voltages $V_{X1}$ and $V_{X2}$.

Also, note that the one-dimensional optical deflector of FIG. 11, 13 or 15 can also be applied to the two-dimensional optical deflector of FIG. 19.

Further, in the above-described embodiments, the piezoelectric actuators are semi-circular or semi-diamond-shaped; however, the piezoelectric actuators can be of another bent-type.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. An optical deflector comprising:
   a mirror;
   a frame surrounding said mirror;
   first and second torsion bars oppositely arranged along a first axis of said frame, each of said first and second torsion bars having an end coupled to a circumference of said mirror;
   first and second piezoelectric actuators which are opposite to each other with respect to said mirror, and which rock said mirror around said first axis, wherein each of said first and second piezoelectric actuators is coupled to both of said first and second torsion bars;
   first and second coupling bars each of which is coupled between said frame and one of said first and second piezoelectric actuators, wherein the first and second coupling bars are arranged along a second axis perpendicular to said first axis;
   another frame surrounding said frame;
   first and second outer piezoelectric actuators which are coupled between said frame and said other frame, and which rock said mirror around the second axis; and
   a control unit which controls said first and second piezoelectric actuators,
   wherein each of said first and second piezoelectric actuators is divided into discrete first, second and third areas between said first torsion bar and said second torsion bar in accordance with boundaries arranged along a first radial direction, a second radial direction, a third radial direction, and a fourth radial direction clockwise from said first axis, wherein said boundaries physically separate said discrete first, second and third areas of each of said first and second piezoelectric actuators,
   wherein the second area of said first piezoelectric actuator is between said first and second radial directions,
   wherein the second area of said second piezoelectric actuator is between said third and fourth radial directions,
   wherein first piezoelectric portions are formed in the first and third areas of said first piezoelectric actuator and in the second area of said second piezoelectric actuator,
   wherein second piezoelectric portions are formed in the first and third areas of said second piezoelectric actuator and in the second area of said first piezoelectric actuator, and
   wherein said control unit applies a first drive voltage to said first piezoelectric portions and applies a second drive voltage opposite in phase to said first drive voltage to said second piezoelectric portions.

2. The optical deflector as set forth in claim 1, wherein the first piezoelectric portions formed in the first and third areas of said first piezoelectric actuator are separated with slits from the second piezoelectric portion formed in the second area of said first piezoelectric actuator, and wherein the second piezoelectric portions formed in the first and third areas of said second piezoelectric actuator are separated with slits from the first piezoelectric portion formed in the second area of said second piezoelectric actuator.

3. The optical deflector as set forth in claim 1, wherein said first and second piezoelectric actuators are semi-circular, and said frame is rectangular.

4. The optical deflector as set forth in claim 1, wherein said first and second piezoelectric actuators are semi-diamond-shaped, and said frame is diamond-shaped.

5. The optical deflector as set forth in claim 4, wherein a width of said first and second piezoelectric actuators is gradually increased from said first and second coupling bars to said first and second torsion bars.

6. The optical deflector as set forth in claim 1, wherein said first and second torsion bars are coupled through said first and second piezoelectric actuators to an inner circumference of said frame.

7. The optical deflector as set forth in claim 6, further comprising:

a piezoelectric sensor at a portion crossing between one of said first and second torsion bars and one of said first and second piezoelectric actuators; and a sense conductive layer connected from said one of said first and second piezoelectric actuators over said one of said first and second torsion bars to a sense pad on said frame; and first and second ground conductive layers sandwiching said sense conductive layer and connected over said one of said first and second torsion bars to a ground pad on said frame.

8. A method for designing an optical deflector which comprises: a mirror; a frame surrounding said mirror; first and second torsion bars oppositely arranged along a first axis of said frame, each of said first and second torsion bars having an end coupled to a circumference of said mirror; first and second piezoelectric actuators which are opposite to each other with respect to said mirror, and which rock said mirror around said first axis, wherein each of said first and second piezoelectric actuators is coupled to both of said first and second torsion bars; first and second coupling bars each of which is coupled between said frame and one of said first and second piezoelectric actuators, wherein the first and second coupling bars are arranged along a second axis perpendicular to said first axis; another frame surrounding said frame; and first and second outer piezoelectric actuators which are coupled between said frame and said other frame, and which rock said mirror around the second axis, said method comprising:

dividing each of said first and second piezoelectric actuators into discrete first, second and third areas between said first torsion bar and said second torsion bar in accordance with designated boundaries arranged along a first radial direction, a second radial direction, a third radial direction, and a fourth radial direction clockwise from said first axis, wherein said boundaries physically separate said discrete first, second and third areas of each of said first and second piezoelectric actuators, and wherein the second area of said first piezoelectric actuator is between said first and second radial directions, and the second area of said second piezoelectric actuator is between said third and fourth radial directions;

forming first piezoelectric portions in the first and third areas of said first piezoelectric actuator and in the second area of said second piezoelectric actuator;

forming second piezoelectric portions in the first and third areas of said second piezoelectric actuator and in the second area of said first piezoelectric actuator; and applying a first drive voltage to said first piezoelectric portions and a second drive voltage opposite in phase to said first drive voltage to said second piezoelectric portions.

9. The method as set forth in claim 8, wherein the first piezoelectric portions formed in the first and third areas of said first piezoelectric actuator are separated with slits from the second piezoelectric portion formed in the second area of said first piezoelectric actuator, and wherein the second piezoelectric portions formed in the first and third areas of said second piezoelectric actuator are separated with slits from the first piezoelectric portion formed in the second area of said second piezoelectric actuator.

10. The method as set forth in claim 8, wherein said first and second piezoelectric actuators are semi-circular, and said frame is rectangular.

11. The method as set forth in claim 8, wherein said first and second piezoelectric actuators are semi-diamond-shaped, and said frame is diamond-shaped.

12. The method as set forth in claim 11, wherein a width of said first and second piezoelectric actuators is gradually increased from said first and second coupling bars to said first and second torsion bars.

13. The method as set forth in claim 8, wherein said first and second torsion bars are coupled through said first and second piezoelectric actuators to an inner circumference of said frame.

14. The method as set forth in claim 13, further comprising:
forming a piezoelectric sensor at a portion crossing between one of said first and second torsion bars and one of said first and second piezoelectric actuators;

forming a sense conductive layer connected from said one of said first and second piezoelectric actuators over said one of said first and second torsion bars to a sense pad on said frame; and forming first and second ground conductive layers to sandwich said sense conductive layer and connected over said one of said first and second torsion bars to a ground pad on said frame.

* * * * *